Feb. 18, 1930.  J. C. MONTEITH  1,747,725
MULTIPLE SECTION SPRING
Filed Jan. 19, 1927
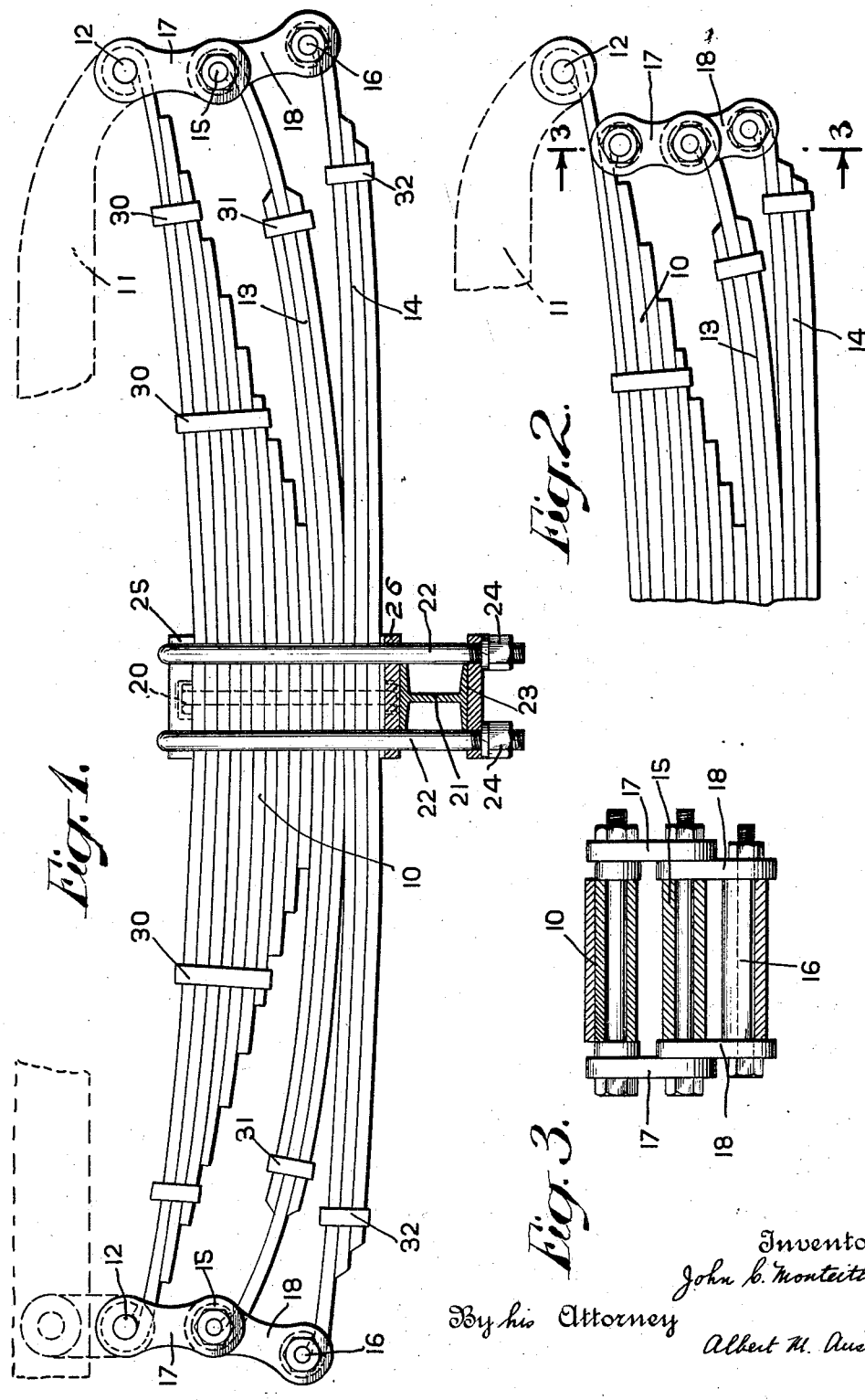
Inventor
John C. Monteith
By his Attorney
Albert M. Austin Patented Feb. 18, 1930

1,747,725

UNITED STATES PATENT OFFICE

JOHN C. MONTEITH, OF CLEVELAND, OHIO, ASSIGNOR TO THE STERLING SPRING COMPANY, OF CLEVELAND, OHIO, A CORPORATION OF DELAWARE

MULTIPLE-SECTION SPRING

Application filed January 19, 1927. Serial No. 161,974.

This invention relates to spring members and more particularly to springs which are subjected to changes of load at relatively frequent intervals.

The invention relates specifically to vehicle springs which support widely varying loads and are subjected to sudden and severe shocks because of changing surface or road conditions.

The invention further relates to a heavy duty chassis spring which is capable of operating at various conditions of load with equal freedom from oscillation and equal shock absorbing ability.

In types of vehicles in which the load is varied between wide limits such as in heavy trucks which may contain either full load or a small fraction thereof, or busses which are subject to various conditions of traffic it is desirable to provide a spring which will possess easy riding qualities when the vehicle is lightly loaded and which will also be capable of withstanding the pressure exerted by the full load of the vehicle when necessary.

Springs as usually constructed for appliance to such vehicles are sufficiently heavy to carry the full load of the vehicle, but when this load is suddenly relieved the springs become stiff and are unable to properly cushion the shocks which are applied by the irregularities of a road.

In accordance with the present invention a vehicle spring is divided into a plurality of sections, each of the sections having independent normal positions of rest and having independent compression resistances which may or may not be equal. One section, which for convenience we may term the main spring, may be adapted to carry the normal unloaded weight of the vehicle and another section, which may be termed the first auxiliary spring, may be normally biased to exert a false load upon the main spring when the vehicle is unloaded. By means of such an arrangement the main spring which may be comparatively light, is capable of freely cushioning shocks which are received by the unloaded vehicle, the first auxiliary spring operating to prevent recoil thereof, and to assist the main spring in cushioning the shock.

When the vehicle is loaded to such a degree that the first auxiliary spring passes its natural free point the latter spring will then assist the main spring in carrying the entire load, thereby producing in effect a stronger spring than that which was originally present.

Another section of the spring, which we may call the second auxiliary spring, may be constructed to have a normal free position such that when connected to the first auxiliary spring it will be distorted from its normal position by a greater amount than the lighter spring.

The second auxiliary will then operate similarly to the first auxiliary in assisting the main spring in cushioning shocks when the vehicle is unloaded or is loaded to the capacity of the first two springs. When the vehicle is loaded to a point at which the second spring passes its free position this spring will also assist the first two springs in sustaining the load of the vehicle. Consequently, at each of the various loads encountered in use the spring is enabled to act freely for cushioning road shocks and when the load is increased extra sustaining effort is brought into action as required.

The number of sections of springs may be extended to four or more should such conditions prove desirable although for ordinary operations three sections have been found to be satisfactory. It would only be in case of extreme variations in load that more than three sections would be required.

Although the novel features which are believed to be characteristic of this invention will be pointed out with particularity in the claims appended hereto, the invention itself, as to its objects and advantages, the mode of its operation and the manner of its organization may be better understood by referring to the following description taken in connection with the accompanying drawings forming a part thereof, in which—

Fig. 1 is an elevation of a vehicle chassis spring constructed in accordance with this invention;

Fig. 3 is a fragmentary elevation of a modification thereof; and

Fig. 3 is a section taken on the line 3—3 of Fig. 2.

Like reference characters denote like parts in the several figures of the drawings.

In the following description and in the claims parts will be identified by specific names for convenience, but they are intended to be as generic in their application to similar parts as the art will permit.

Referring to the drawings more particularly, the spring construction disclosed in Fig. 1 comprises a semielliptic spring member 10 which is adapted for connection to a vehicle chassis 11. Spring 10 comprises a plurality of leaves progressively decreasing in length in accordance with the well known and accepted methods of spring construction, the upper leaf being extended at its ends and curved to provide knuckles to facilitate connection to the chassis. Such connection may be made in any approved manner such as by bolts passing through knuckles 12 and cooperating with suitable portions of the frame.

In addition to the above mentioned leaves the spring is provided with a plurality of sets of leaves 13 and 14 which in the position shown are distorted from their normal position by unequal amounts. Spring 13, which may comprise one or more leaves, is connected to spring 10 by means of knuckle 15 which is provided on the end of one of the leaves, and spring 14 is connected to spring 13 in a similar manner by means of knuckle 16. Suitable connecting links 17 and 18 may be employed for connecting the various knuckles, the links being placed under tension when the assembly is completed.

The spring leaves may be firmly connected together at the center as by bolt 20 and may be attached to an axle 21 in any convenient manner such as by U-bolts 22 which are passed around the spring leaves and cooperate with a suitable clamping plate 23 placed below said axle. Bearing-plates 25 and 26 may be inserted respectively above and below spring 10 and provided with suitable recesses to receive the head of bolt 20. The spring leaves and the axle may then be firmly clamped together by nuts 24, which are threaded upon the ends of U-bolts 22.

The usual clip members 30, 31 and 32 may be provided around the various groups of leaves to prevent them from becoming separated during movement of the spring.

The above mentioned spring, as normally constructed and before the various sections 10, 13 and 14 have been interconnected, will lie at rest with the ends of sections 13 and 14 normally a greater distance from the end of section 10 than that shown in the drawing.

In order to assemble the springs, section 14 may be distorted from its condition of rest toward section 13 and the two fastened together by means of link 18. Sections 13 and 14 may then be distorted as a unit from their natural position of rest toward spring 10 and attached thereto by means of link 17. The sections when thus assembled will assume a new position of rest in accordance with the compression resistances of the various sections and with the amount with which each section has been previously distorted.

Sections 13 and 14 when the vehicle is unloaded each exert a downward pressure against spring 10 thereby introducing a false load and working against spring 10 during recoil. When the spring assembly is compressed in response to a load in the vehicle the springs 13 and 14 will successively pass their free points and each of these springs in so doing will assume a portion of the load of the vehicle and thereafter act in conjunction with spring 10 in supporting its load.

The weight of the unloaded vehicle will be supported entirely by spring 10, springs 13 and 14 acting to control the movement of said spring 10 and to prevent excessive rebound thereof during operation. Should a sufficient load, however, be placed upon the vehicle to cause spring 13 to pass its free point it will then be in compression and will assist spring 10 in supporting the load. Spring 14 in this case, which has not yet passed its free point, will exert a downward pressure on the two first mentioned springs, and will operate to prevent excessive rebounds thereof.

When the load of the vehicle is increased to a sufficient amount to cause spring 14 to pass its free point this spring will also assume its portion of the load of the vehicle and assist the other two springs in carrying that load.

The design of the springs may be altered to provide the required operating characteristics by changing the relative compression resistances of the springs and varying the distortion of the auxiliary springs with respect to the main spring. Spring 13 may if desired be designed to operate equally in compression and recoil above and below its free position, in which case it may be desirable to utilize extra leaves which may be placed on either side of the main leaf and connected thereto by suitable straps, such as 31.

Spring 14 may be designed similar to spring 13, or it may be designed mainly as a load supporting spring to come into operation when the spring has been compressed below its free point. In such case it may be desirable to attach extra leaves below the main spring for the purpose of assisting it in supporting the load and securing these leaves to the main leaf by a clip 32.

In the modification disclosed in Fig. 2 the various springs are designed to operate similarly to those shown in Fig. 1. However, spring 13 is shown as attached to spring 10 by means of a special knuckle which may be formed integral with one of the shorter leaves of spring 10 such as the second leaf. In this case the second leaf is provided with an extension which is curved to form a knuckle to which strap 17 may be attached by a suitable knuckle bolt passing through the holes in the end of the strap and the knuckle itself. This form of construction may be advantageous under certain conditions, such as in cases where the main knuckle 12 is comparatively inaccessible.

The particular distribution of the load between the various springs will depend in each case upon the variation in load of the vehicle between full load and no load and upon the riding qualities desired. A particular distribution has been shown by way of illustration only.

This spring is particularly applicable to heavy busses which are capable of operating at high speed and are equipped with balloon tires. In such vehicles it is especially important to provide proper cooperation between the springs and tires for preventing the vehicle from being set into disagreeable vibrations in response to road shocks. It has heretofore been considered extremely difficult to provide a spring which is capable of properly cooperating with balloon tires for cushioning road shocks under the various conditions of load to which such vehicles are subjected. By means of the present construction, however, proper riding conditions may be assured with no load and full load and with all conditions between these two extremes.

Should extreme uniformity be required it may be desirable to utilize additional sections and design them to come into operation at successive loads whereby each section may operate to sustain a certain proportion of the load when depressed beyond its free point and when above that position may assist in cushioning road shocks received and prevent rebound of the entire assembly. Although it may be necessary to employ various numbers of additional spring sections, a three section spring has been shown in the drawing for purposes of illustration.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. A spring assembly comprising at least three spring sections, certain of said sections normally opposing the action of the other sections and means for successively causing said first mentioned sections to assist the action of said other sections as the load thereon is increased.

2. A spring assembly comprising a main spring and a plurality of auxiliary springs, said auxiliary springs being normally distorted to oppose the action of said main spring and being successively reversed in compression so as to assist the action of the main spring as the main spring is progressively compressed.

3. A spring assembly comprising a main spring section and a plurality of auxiliary sections, each of said auxiliary sections being distorted from its free position to exert a false load on the main section whereby violent recoil thereof is prevented.

4. A spring assembly comprising a main spring and a plurality of auxiliary springs, each of said auxiliary springs being normally distorted from its free position to exert a false load upon the main spring, said auxiliary springs cooperating with said main spring to assist in carrying the load when they have been flexed past their free point.

5. A spring assembly comprising a main spring and first and second auxiliary springs, means for distorting said first and second auxiliary springs from their free position toward said main spring, and for connecting said springs to said main spring while so distorted, whereby said auxiliary springs operate to limit the recoil of said main spring and whereby said auxiliary springs are successively brought into operation to assist the main spring in carrying the load as the load thereon is increased.

6. In combination with a vehicle chassis, a spring assembly comprising a main spring and a plurality of auxiliary springs, said auxiliary springs being normally distorted by unequal amounts from their free position, and means for attaching said springs to said main spring while so distorted, whereby in one position said auxiliary springs operate to limit the recoil of the main spring and in another position said springs assist the main spring in carrying the load.

7. In combination with a vehicle chassis, a spring assembly comprising a main spring and a plurality of auxiliary springs, said auxiliary springs being normally distorted by unequal amounts from their free position, and means for attaching said springs to said main spring while so distorted, whereby in one position said auxiliary springs operate to limit the recoil of the main spring and in another position said springs assist the main spring in carrying the load.

In testimony whereof I have hereunto set my hand.

JOHN C. MONTEITH.